United States Patent Office 3,723,354
Patented Mar. 27, 1973

3,723,354
X-RAY ABSORBING GLASS COMPOSITIONS CONTAINING LEAD OXIDE AND CERIUM OXIDE
Masamichi Wada, Iwao Ishida, and Isamu Nakagawa, Otsu, Japan, assignors to Nippon Electric Glass Company, Limited, Tokyo, Japan
No Drawing. Filed July 21, 1971, Ser. No. 164,855
Claims priority, application Japan, July 28, 1970, 45/45,396
Int. Cl. C04b 35/68
U.S. Cl. 252—478                                     8 Claims

ABSTRACT OF THE DISCLOSURE

Glass compositions consisting essentially, by weight, of 57–62% $SiO_2$, 2–3.5% $Al_2O_3$, 4–10% $K_2O$, 5–11% $Na_2O$, 10–16% BaO, 1–10% ZnO, 0.1–4% $WO_3$, 0.2–0.6% $CeO_2$, less than 5% CaO, less than 2% MgO and less than 1% PbO, wherein the total of the amounts of CaO, MgO and BaO exceeds 14% and the total of the amounts of BaO, ZnO, $WO_3$, and PbO exceeds 12%.

---

This invention relates to glass compositions having large X-ray absorbing capacities and excellent resistance to discoloration due to the irradiation thereof with electron, X-ray and solar rays.

With increasing voltages being applied to television picture tubes, leakage of X-rays from the television picture tube cause a problem. A further problem which arises concerns the browning and blackening of the face glass of the television picture tube which is brought about by X-ray and electron irradiation thereof.

It is known that PbO acts to increase the X-ray absorbing properties of glass. However, the addition of large amounts of PbO to glass compositions markedly increases the tendency of the resultant glass to undergo browning on irradiation thereof with X-rays. The addition of CeO to the glass composition has been proposed to inhibit the tendency of PbO-containing glass to undergo browning on being subjected to X-ray irradiation and has to some extent proved successful in this connection. However, CeO is entirely ineffective for inhibiting discoloration of the glass due to irradiation thereof with electron and solar rays. It has been established by considerable investigation that, even if the maximum permissible amount of $CeO_2$ is added to the glass composition, the tendency of the glass to undergo discoloration due to electron irradiation is not prevented and further the simultaneous adjustment of light transmittance and reduction of discoloration or browning of the television picture tube panel is only realized with great difficulty where PbO has been included in the glass composition in an amount exceeding 1% by weight. The discoloration, i.e. browning of this glass due to electron bombardment, is most marked as can be seen from Example 1 of Table 1 which appears later in the disclosure.

Although it is also known that BaO can absorb X-rays to a considerable extent and also acts to suppress the discoloration of the glass due to electron irradiation, glass compositions which contain amounts of BaO as high as 18.8% are not satisfactory for use as the face glass of television picture tubes because of their insufficient X-ray absorbing capacities. (The X-ray absorbing capacity of BaO-containing glass compositions is unsatisfactory where the BaO is present in an amount of less than 19%, as can be seen from Example 2 of Table 1.) The addition of large amounts of BaO is detrimental to the melting and refining properties of the glass and, consequently, it is difficult to obtain a seed free glass. For these reasons, glass containing large amounts of BaO has also not proved suitable for use in the manufacture of face glass intended for use in connection with television picture tubes.

BaO-containing glass compositions are known from Japanese Pat. No. 7,127/68 and British Pat. No. 1,123,-857.

The Japanese patent teaches glass compositions containing 7–12% of BaO but no PbO. Such glass compositions have a very low X-ray absorbing capacity, as can be seen from Example 2 of Table 1. Glass compositions containing 0.2% PbO and 11–14% of BaO have X-ray absorbing capacities approximating the standard values in those instances where the PbO content amounts to about 2%; however, the glass undergoes browning or discoloration on exposure to electron irradation. (See Example 1 of the table.)

It has been proposed to produce glass compositions containing SrO (U.S. Pat. No. 3,464,932). Glass compositions containing 10% SrO are commercially produced. However, SrO is a relatively expensive material and not readily available.

It is an object of this invention to provide glass compositions suitable for use as television tube face glass.

It is another object of this invention to provide glass compositions having large X-ray absorbing capacities but which have substantially reduced tendencies to undergo discoloration on exposure to electron or X-ray irradiation.

Still another object of the invention is to provide such glass compositions which can be economically produced.

These and other objects and advantages of the invention will become apparent from a consideration of the following disclosure.

In accordance with the present invention, it has been discovered that glass compositions consisting essentially, by weight, of 57–62% $SiO_2$, 2–3.5% $Al_2O_3$, 4–10% $K_2O$, 5–11% $Na_2O$, 10–16% BaO, 1–10% Zn, 0.1–4% $WO_3$, 0.2–0.6% $CeO_2$, less than 5% CaO, less than 2% MgO and less than 1% PbO, wherein the total of the amounts of CaO, MgO and BaO exceeds 14% and the total of the amounts of BaO, ZnO, $WO_3$ and PbO exceeds 12%, are characterized by high X-ray absorbing capacities, a reduced tendency to undergo discoloration on exposure to electron, X-ray and solar ray irradiation, and by high strain points of more than 450° C.

The PbO content of the glass compositions of this invention is maintained at less than 1% in order to prevent discoloration, the combined presence of PbO, BaO, ZnO and $WO_3$ in excess of 12% providing an excellent X-ray absorbing capacity.

In the manufacture of television picture tubes, the same are heated up to temperatures of about 450° C. in the procedure of connecting the face portion to the funnel portion and in connection with the evacuation of the tube. The tube should not undergo even the slightest deformation during these heating steps as television picture tubes are required to be made to extremely exact dimensions and sizes. It is, therefore, required that the strain point of the glass compositions used for manufacture of television picture tubes exceed 450° C.

Illustrative examples of the glass compositions of the invention are set out in Table 1. In the table, $\mu$ indicates the value obtained for the 0.6 A. X-ray linear absorption coefficient. Face glass intended for use in color television picture tubes is required to have a $\mu$ value which is greater than 19. The degree of browning of the glass which is caused by exposure to X-ray irradiation is indicated in the table by a value representing the difference between light transmission of the glass determined prior to and 10 minutes following X-ray irradiation for a 20-minute period with an X-ray tube at a voltage of 35 kv. and a current of 20 ma. The degree of browning of the glass caused by electron bombardment is indicated in the table by a value representing the difference between the light transmission of the glass prior to and 6 hours after an electron bombardment of 20 $\mu$a./cm.$^2$, 30 kv. for 60 minutes.

The degree of browning resulting from either X-ray or electron irradiation most advantageously should not exceed 22%, taking into consideration the characteristics of the conventional picture tube.

The following examples are given to illustrate the invention more fully but are not to be construed as in any way limiting the scope thereof, Examples 1, 2 and 9 indicating prior art glass compositions.

Glass composition 9 containing 2.4% of PbO has a browning degree of 50% following irradiation from an electron beam of 20 $\mu$a./cm.$^2$. This glass composition has only a 9% degree of browning due to irradiation with an electron beam of 12.3 $\mu$a./cm.$^2$. (In this case, an irradiating time of 75 minutes was involved which is 15 minutes longer than that used in connection with the determination of the browning value for the 20 $\mu$a./cm.$^2$ electron beam irradiation.)

The known glass composition of Example 2 which con-

TABLE

|  | 1 | 2 | 3 | 4 | 5 | 6 | 7 | 8 | 9 |
|---|---|---|---|---|---|---|---|---|---|
| $SiO_2$ | 61.0 | 60.7 | 59.3 | 58.5 | 60.9 | 59.8 | 60.4 | 59.4 | 60.9 |
| $Al_2O_3$ | 3.3 | 3.4 | 3.2 | 3.0 | 3.3 | 2.5 | 2.5 | 2.5 | 3.3 |
| MgO | 1.3 | 1.3 | 1.2 | 1.0 | 0.7 |  | 0.5 |  | 1.3 |
| CaO | 3.4 | 3.3 | 3.2 | 3.1 | 1.3 | 3.0 | 2.7 | 3.5 | 3.3 |
| BaO | 13.8 | 18.8 | 13.7 | 14.9 | 13.8 | 13.8 | 13.7 | 13.7 | 13.8 |
| ZnO |  |  | 2.3 | 3.6 | 3.6 | 3.3 | 3.3 | 4.5 |  |
| $WO_3$ |  |  | 1.0 | 0.5 | 0.5 | 0.5 | 0.5 | 0.1 |  |
| PbO | 1.7 |  | 0.7 | 0.7 | 0.7 | 0.7 | 0.7 | 0.7 | 2.4 |
| $Na_2O$ | 7.5 | 6.2 | 7.5 | 7.2 | 7.6 | 7.9 | 7.7 | 7.6 | 7.3 |
| $K_2O$ | 7.3 | 6.0 | 7.3 | 7.9 | 7.3 | 8.4 | 7.7 | 7.6 | 7.3 |
| $CeO_2$ | 0.7 | 0.3 | 0.6 | 0.6 | 0.3 | 0.9 | 0.3 | 0.4 | 0.4 |
| Total | 100.0 | 100.0 | 100.0 | 100.0 | 100.0 | 100.0 | 100.0 | 100.0 | 100.0 |
| Strain point (° C.) |  |  | 478 | 475 | 460 | 455 | 460 | 461 |  |
| $\mu$ (cm.$^{-1}$ 0.6 ° A.) | 19.3 | 17.8 | 19.7 | 20.1 | 19.0 | 19.7 | 19.5 | 19.5 | 20.0 |
| Browning deg. for X-ray (percent) | 5.7 | 15.2 | 7.5 | 7.6 | 19.6 | 20.4 | 20.9 | 21.5 | 23.0 |
| Browning deg. for electron (percent) | 37.7 | 12.3 | 15.7 | 19.3 | 17.6 | 21.3 | 19.2 | 21.4 | 50.0 |

In the specific examples recorded in the table, the batch ingredients were compounded, mixed together to aid in obtaining homogeneous melt, and then melted in open platinum crucibles at 1450–1500° C. for about four hours, the molten batch being stirred to insure a homogeneous melt. The melts were thereafter poured into steel molds, 6" x 6" x 1", and transferred to an annealer operating at about 480–500° C. The glass shapes were removed from the molds, ground and polished, and then tested for the transmission of X-radiation.

As can be seen from the table, the conventional glass composition of Example 1, which contains 1.7% PbO and 13.8% BaO, has an X-ray absorbing value ($\mu$) of 19.3 which is higher than the standard value. This glass composition contains a large amount, i.e. 1.7 weight percent, PbO and in view thereof a very large amount, i.e. 0.7% of $CeO_2$ (more than 0.6% of $CeO_2$ addition must be avoided however in order not to impart to the glass composition a yellow color). In this glass composition, discoloration due to X-ray irradiation is inhibited while browning of the glass due to electron bombardment is not fully prevented.

The discoloration of the glass due to the electron bombardment has been indicated in the table as the degree of browning and is the value which represents the difference between the light transmission of the glass measured 6 hours following irradiation with an electron beam of 20 $\mu$a./cm.$^2$ and 30 kv. for 60 minutes and the light transmission of the glass before irradiation with the electron beam.

The browning of the glass composition due to electron irradiation varies markedly with any change in the intensity of the electron beam or the velocity and amount of electrons. In the drawing which forms a part of the disclosure, the relationship between the intensity of the electron beam, the browning degree of the glass composition and the PbO content in the glass composition have been set out. It can be appreciated from the drawing that the degree of browning caused by the more than 20 $\mu$a./cm.$^2$ electron beam irradiation differs considerably from the degree of browning caused by irradiation from an electron beam of less than 15.1% $\mu$a./cm.$^2$. Thus the glass composition of Example 1 exhibits a browning degree of more than 37.7% after irradiation with the electron beam of more than 20 $\mu$a./cm.$^2$, but a browning degree of less than 14% when irradiated with an electron beam of less than 15.1 $\mu$a./cm.$^2$.

tains no PbO demonstrates a low X-ray linear absorption coefficient ($\mu$) which does not attain the standard value, even though large amounts (18.8%) of BaO have been added, the latter being detrimental to melting and forming of the glass. The known glass compositions do not possess both a high X-ray absorption coefficient exceeding the standard value and also a favorable resistance to discoloration.

In accordance with this invention, high quality glass compositions are provided which undergo substantially no discoloration on exposure to irradiation by intensive electron beams of up to 20 $\mu$a./cm.$^2$.

All of the glass compositions 3–8 in accordance with the invention have strain points which are in excess of 450° C., a $\mu$ value of more than 19, a browning degree of less than 22% following irradiation with X-rays or an electron beam, including in particular irradiation with strong electron beams of 20 $\mu$a./cm.$^2$ and as well excellent melting and forming properties. These glass compositions are therefore advantageously used for the production of the face glass portion of television picture tubes. A further advantage of the invention lies in that the glass compositions are composed of readily available materials and can be melted and otherwise worked in the conventional manner.

The upper and lower limits of each of the components are determined by the following:

The addition of more than 5% CaO to the glass composition increases the strain point of the glass resulting in an impaired workability;

The addition of more than 2% MgO to the glass composition reduces the strain point to below 450° C. so that the resultant composition cannot be suitably used for making panels for color television tubes;

The addition of less than 10% of BaO does not impart sufficient X-ray absorbing capacity to the glass composition, while additions of more than 16% of BaO adversely influence the melting and refining properties of the glass;

If the sum of the CaO, MgO and BaO does not exceed 14%, satisfactory X-ray absorbing capacities are not obtained and further the strain point is not maintained at a value in excess of 450° C.;

The addition of less than 1% of ZnO does not result in sufficient X-ray absorbing capacities of the glass while the addition of more than 10% of ZnO produces an undesirable hardening of the glass;

The use of less than 0.1% of $WO_3$ results in an insufficient X-ray absorbing capacity but with the addition of more than 4% of $WO_3$, all of the $WO_3$ is not dissolved in the glass composition;

An addition of more than 1% of PbO brings about a discoloration of the glass composition when the same is exposed to electron bombardment;

If the sum of the amounts of ZnO, $WO_3$ and PbO present in the composition does not exceed 12% a satisfactory X-ray absorbing capacity is not obtained;

An addition of at least 0.2% of $CeO_2$ to the glass composition is required in order to prevent discoloration of the glass; however, an amount of 0.6% of $CeO_2$ must not be exceeded as this results in a glass having a yellow color.

The compositions from which the glass of the present invention are prepared may be made up in any desired manner. Thus, for example, a mixture of the $SiO_2$, $Al_2O_3$, etc. in the proportions indicated is first prepared. This mixture is then finely intermixed and melted in a high temperature crucible, for instance an induction heated crucible. The cooling and refining of the melt are carried out in the conventional manner as is the forming of the glass into the television tube face plates.

What is claimed is:

1. A glass composition consisting essentially, by weight, of 57–62% $SiO_2$, 2–3.5% $Al_2O_3$, 4–10% $K_2O$, 5–11% $Na_2O$, 10–16% BaO, 1–10% ZnO, 0.1–4% $WO_3$, 0.2–0.6% $CeO_2$, less than 5% CaO, less than 2% MgO and less than 1% PbO, wherein the total of the amounts of CaO, MgO and BaO exceeds 14%, and the total of the amounts of BaO, ZnO, $WO_3$ and PbO exceeds 12%.

2. A glass composition according to claim 1 consisting of

| | Wt. percent |
|---|---|
| $SiO_2$ | 59.3 |
| $Al_2O_3$ | 3.2 |
| MgO | 1.2 |
| CaO | 3.2 |
| BaO | 13.7 |
| ZnO | 2.3 |
| $WO_3$ | 1.0 |
| PbO | 0.7 |
| $Na_2O$ | 7.5 |
| $K_2O$ | 7.3 |
| $CeO_2$ | 0.6 |

3. A glass composition according to claim 1 consisting of

| | Wt. percent |
|---|---|
| $SiO_2$ | 58.6 |
| $Al_2O_3$ | 3.0 |
| MgO | 1.0 |
| CaO | 3.1 |
| BaO | 14.9 |
| ZnO | 3.6 |
| $WO_3$ | 0.5 |
| PbO | 0.7 |
| $Na_2O$ | 7.2 |
| $K_2O$ | 6.9 |
| $CeO_2$ | 0.6 |

4. A glass composition according to claim 1 consisting of

| | Wt. percent |
|---|---|
| $SiO_2$ | 60.9 |
| $Al_2O_3$ | 3.3 |
| MgO | 0.7 |
| CaO | 1.3 |
| BaO | 13.8 |
| ZnO | 3.6 |
| $WO_3$ | 0.5 |
| PbO | 0.7 |
| $Na_2O$ | 7.6 |
| $K_2O$ | 7.3 |
| $CeO_2$ | 0.3 |

5. A glass composition according to claim 1 consisting of

| | Wt. percent |
|---|---|
| $SiO_2$ | 59.8 |
| $Al_2O_3$ | 2.5 |
| CaO | 3.0 |
| BaO | 13.8 |
| ZnO | 3.3 |
| $WO_3$ | 0.5 |
| PbO | 0.7 |
| $Na_2O$ | 7.9 |
| $K_2O$ | 8.1 |
| $CeO_2$ | 0.4 |

6. A glass composition according to claim 1 consisting of

| | Wt. percent |
|---|---|
| $SiO_2$ | 60.4 |
| $Al_2O_3$ | 2.5 |
| MgO | 0.5 |
| CaO | 2.7 |
| BaO | 13.7 |
| ZnO | 3.3 |
| $WO_3$ | 0.5 |
| PbO | 0.7 |
| $Na_2O$ | 7.7 |
| $K_2O$ | 7.7 |
| $CeO_2$ | 0.3 |

7. A glass composition according to claim 1 consisting of

| | Wt. percent |
|---|---|
| $SiO_2$ | 59.4 |
| $Al_2O_3$ | 2.5 |
| CaO | 3.5 |
| BaO | 13.7 |
| ZnO | 4.5 |
| $WO_3$ | 0.1 |
| PbO | 0.7 |
| $Na_2O$ | 7.6 |
| $K_2O$ | 7.6 |
| $CeO_2$ | 0.4 |

8. A glass composition according to claim 1, containing in excess of 12% BaO and at least 0.7% PbO.

References Cited
UNITED STATES PATENTS

| 3,356,579 | 12/1967 | Harrington | 252—478 X |
| 3,369,961 | 2/1968 | Dalton et al. | 252—478 X |
| 3,464,932 | 9/1969 | Connelly et al. | 252—478 |
| 3,619,219 | 11/1971 | Bromer et al. | 252—478 X |
| 3,627,549 | 12/1971 | La Grouw | 252—478 X |

STEPHEN J. LECHERT, JR., Primary Examiner

U.S. Cl. X.R.

106—53